A. BALL.
MINING MACHINE.
APPLICATION FILED JULY 3, 1906.

1,185,275. Patented May 30, 1916.
9 SHEETS—SHEET 1.

Fig. 1.

Fig. 26.

Witnesses:
Robert H. Kammler
Horace H. Grosman

Inventor:
Albert Ball
by Emery & Booth
Attys

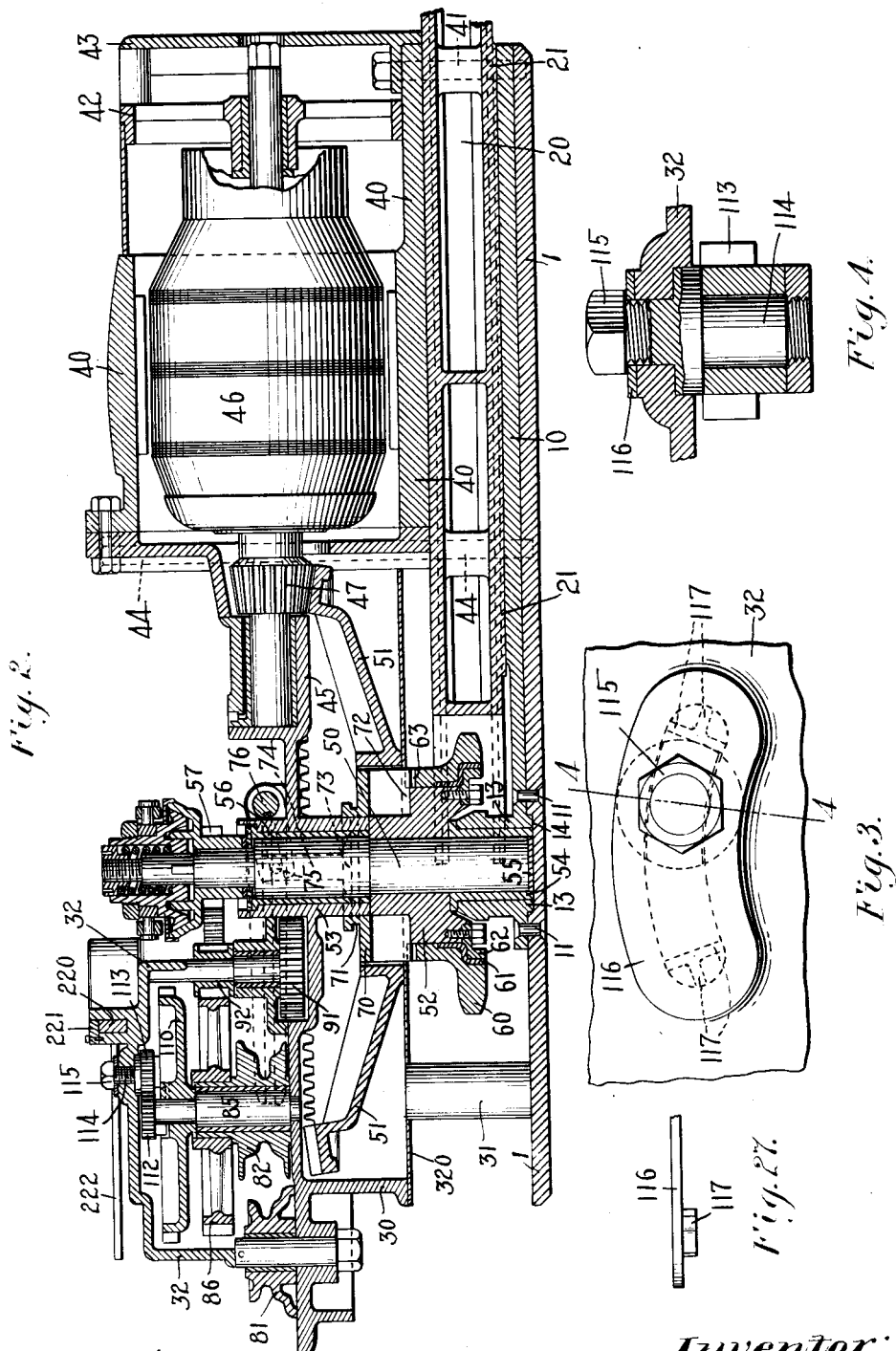

A. BALL.
MINING MACHINE.
APPLICATION FILED JULY 3, 1905.
1,185,275.
Patented May 30, 1916.
9 SHEETS—SHEET 3.
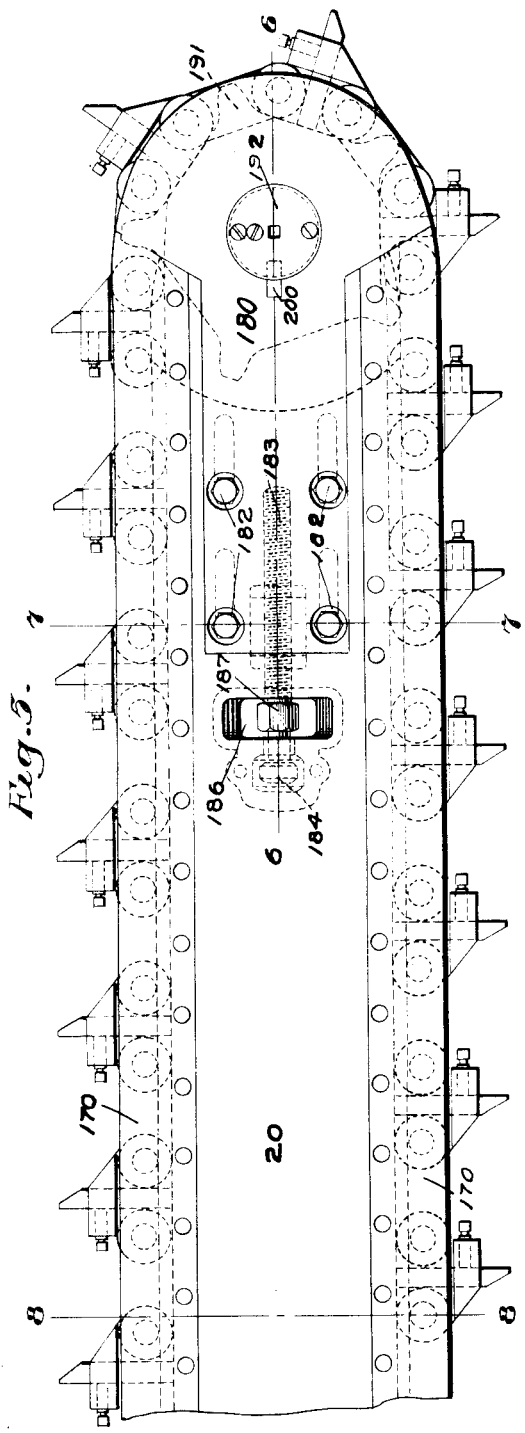
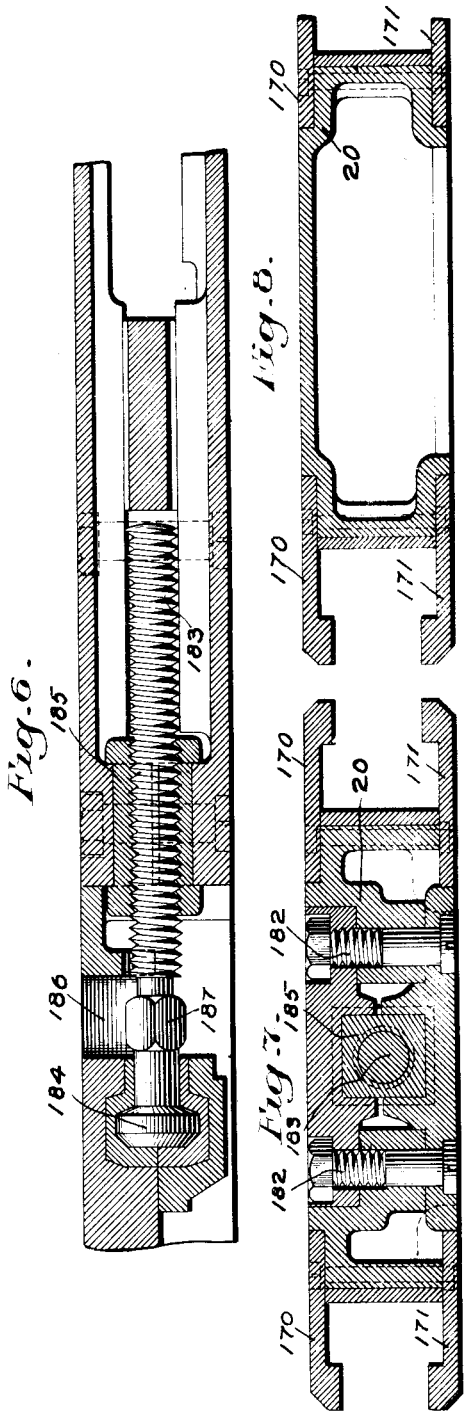
Witnesses:
Adolph C. Kaiser
Robert H. Kammler
Inventor:
Albert Ball
by Emery Booth
Attys.

A. BALL.
MINING MACHINE.
APPLICATION FILED JULY 3, 1906.
1,185,275.
Patented May 30, 1916.
9 SHEETS—SHEET 4.
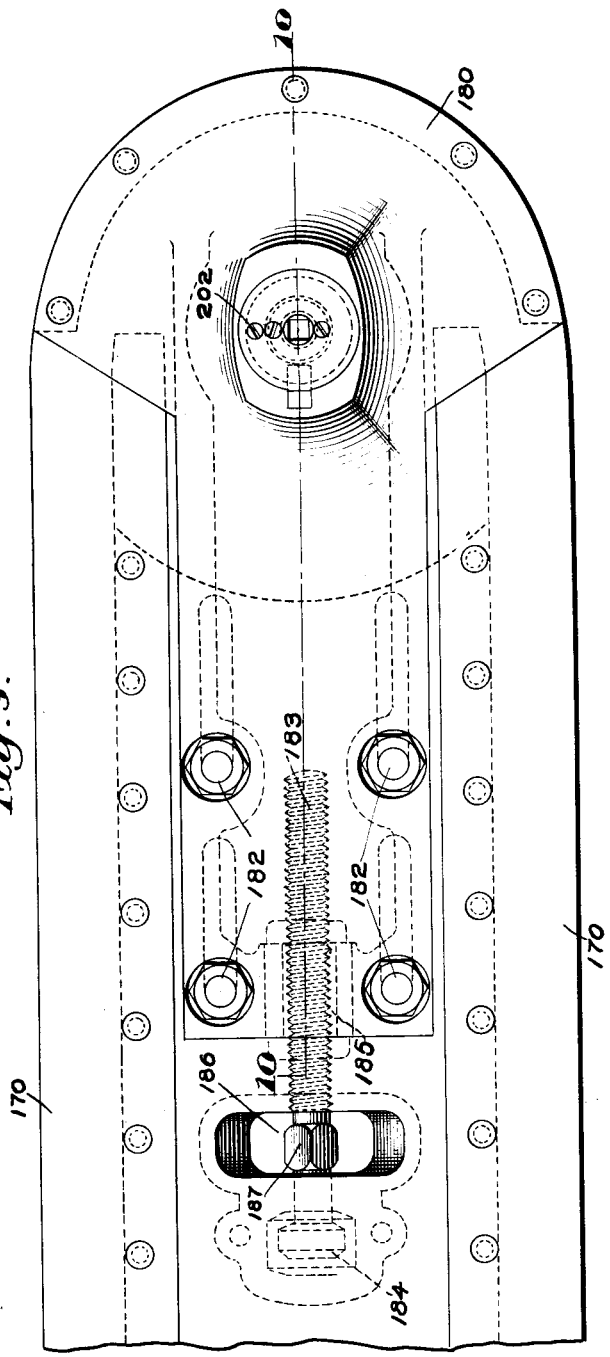
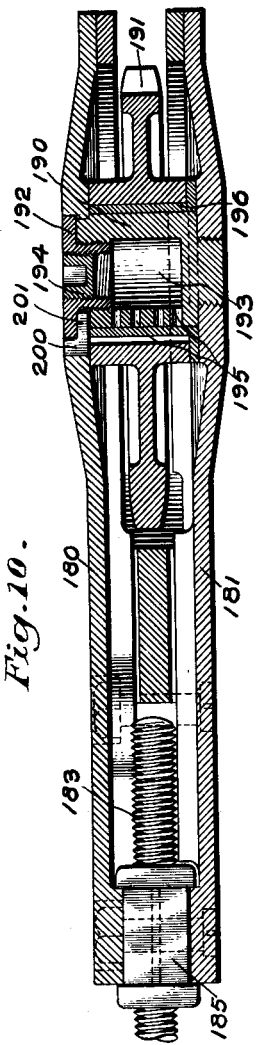
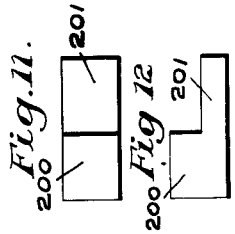
Witnesses
Adolph C Kaiser.
Robert H. Kammler
Inventor
Albert Ball
by Emery Booth
Attys

A. BALL.
MINING MACHINE.
APPLICATION FILED JULY 3, 1906.

1,185,275.
Patented May 30, 1916.
9 SHEETS—SHEET 5.

Witnesses:
Adolph C. Kaiser
Robert H. Kammler

Inventor
Albert Ball
by Emery Booth
Attys.

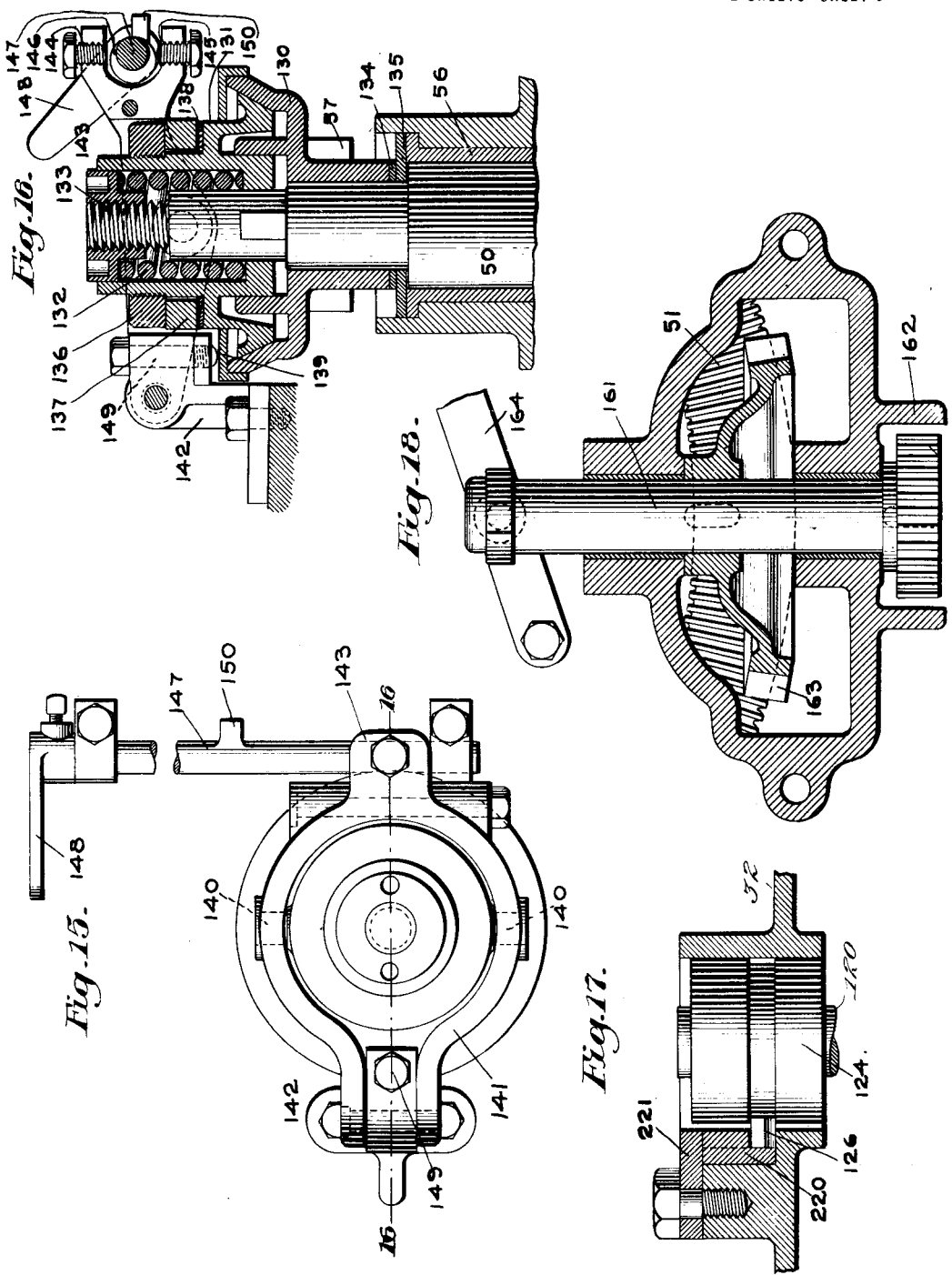

A. BALL.
MINING MACHINE.
APPLICATION FILED JULY 3, 1906.
1,185,275.
Patented May 30, 1916.
9 SHEETS—SHEET 7.
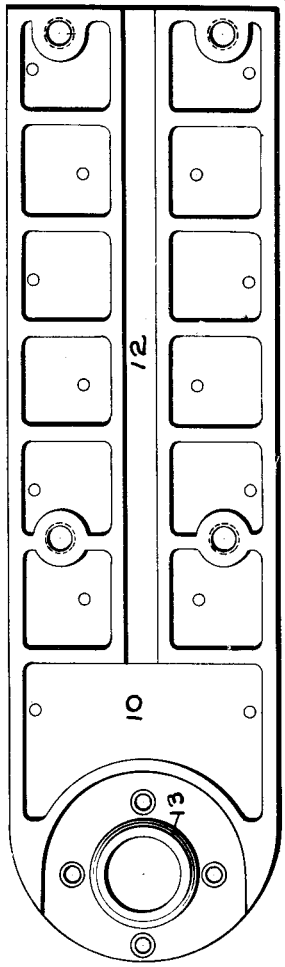
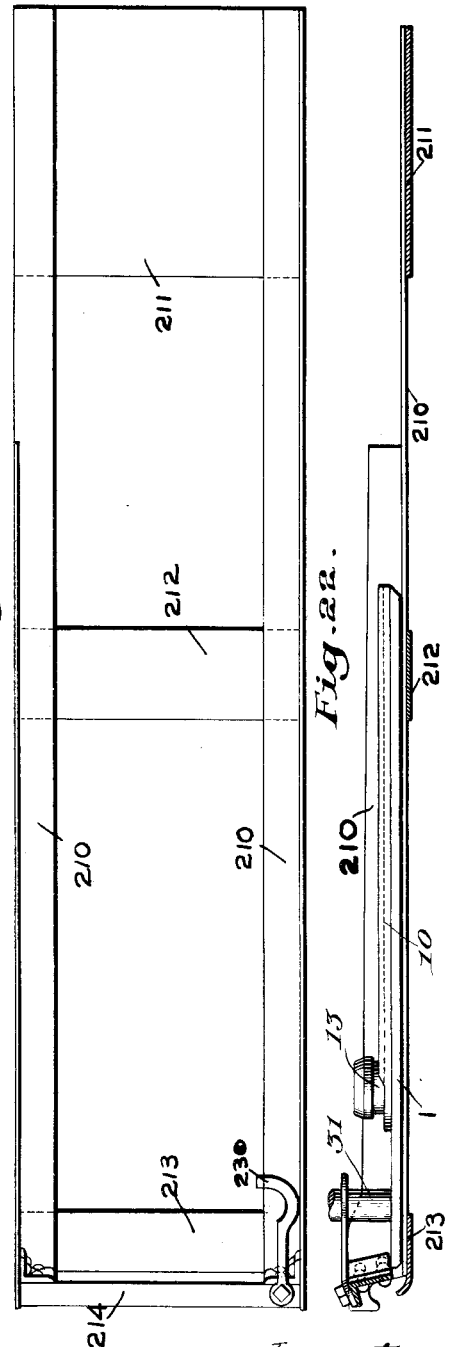
Witnesses:
Adolph C Kaiser
Robert H Kammler
Inventor:
Albert Ball
by Emery Booth
Att'ys

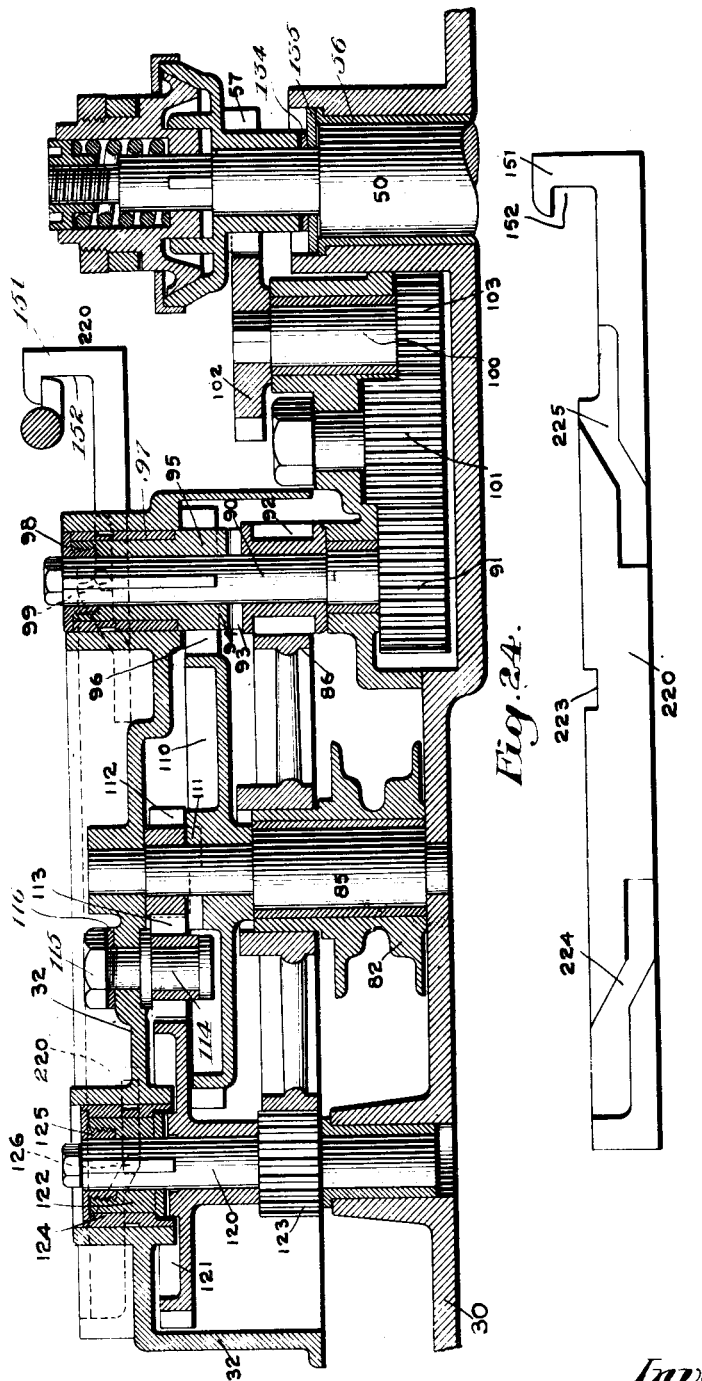

A. BALL.
MINING MACHINE.
APPLICATION FILED JULY 3, 1906.

1,185,275.

Patented May 30, 1916.
9 SHEETS—SHEET 9.

Witnesses:
Edwin T. Luer
William C. Glass

Inventor:
Albert Ball
by Emery Booth
Attys.

UNITED STATES PATENT OFFICE.

ALBERT BALL, OF CLAREMONT, NEW HAMPSHIRE, ASSIGNOR, BY MESNE ASSIGNMENTS, TO SULLIVAN MACHINERY COMPANY, OF BOSTON, MASSACHUSETTS, A CORPORATION OF MASSACHUSETTS.

MINING-MACHINE.

1,185,275.  Specification of Letters Patent.  Patented May 30, 1916.

Application filed July 3, 1906.  Serial No. 324,671.

*To all whom it may concern:*

Be it known that I, ALBERT BALL, a citizen of the United States, residing at Claremont, in the county of Sullivan and State of New Hampshire, have invented an Improvement in Mining-Machines, of which the following description, in connection with the accompanying drawings, is a specification, like letters on the drawings representing like parts.

My invention relates to mining machines and more particularly to machines of the cutter chain type which are fed along the wall in which the cut is being made.

Among the objects of my invention are the provision of improved means for controlling and handling such machines and various improved constructional features which result in a machine of very compact form and of great strength and effectiveness.

My invention will be best understood by reference to the following description when taken in connection with the accompanying illustration of one specific embodiment thereof, while its scope will be more particularly pointed out in the appended claims.

Figure 13:
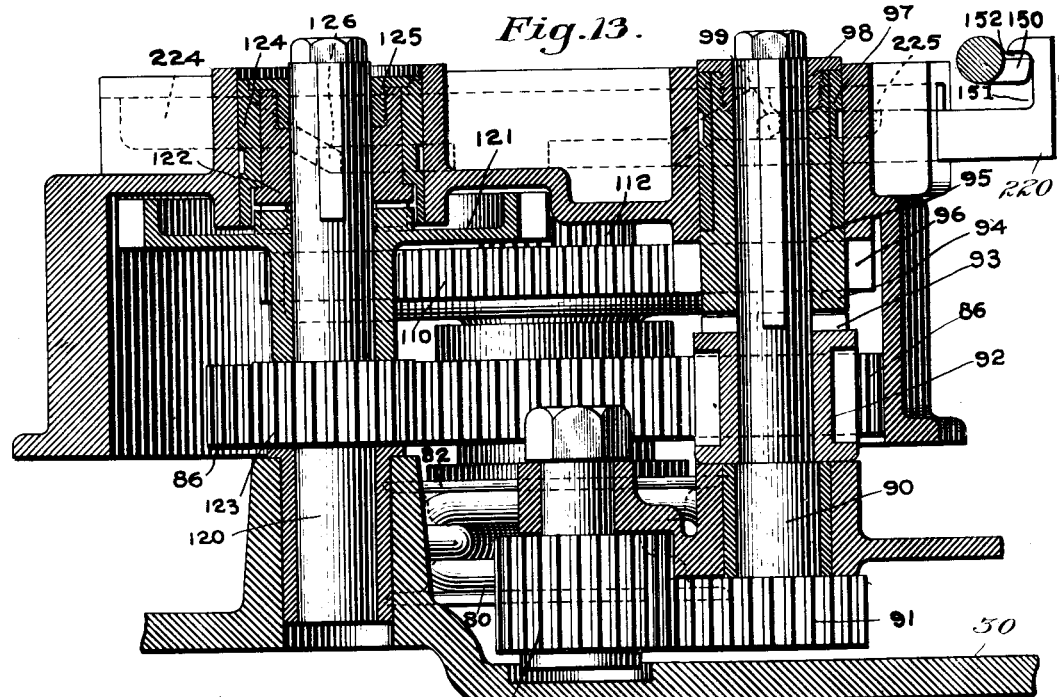
Figure 14:
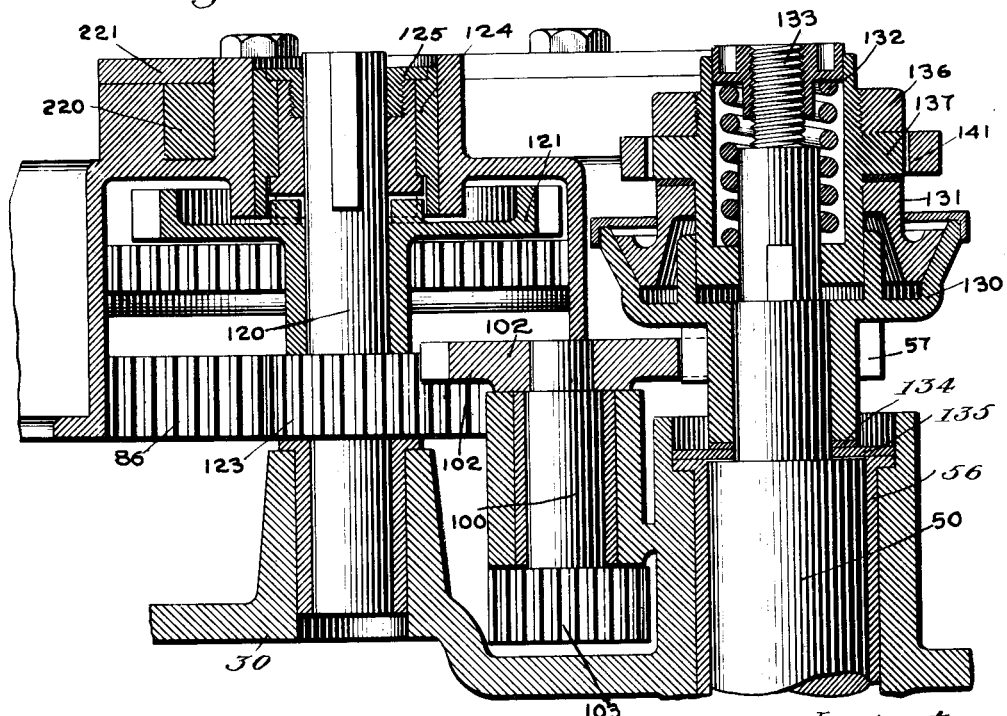
Figure 28:
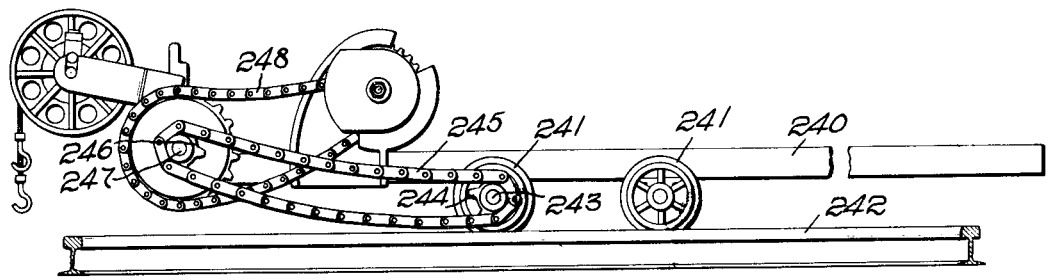
Figure 29:
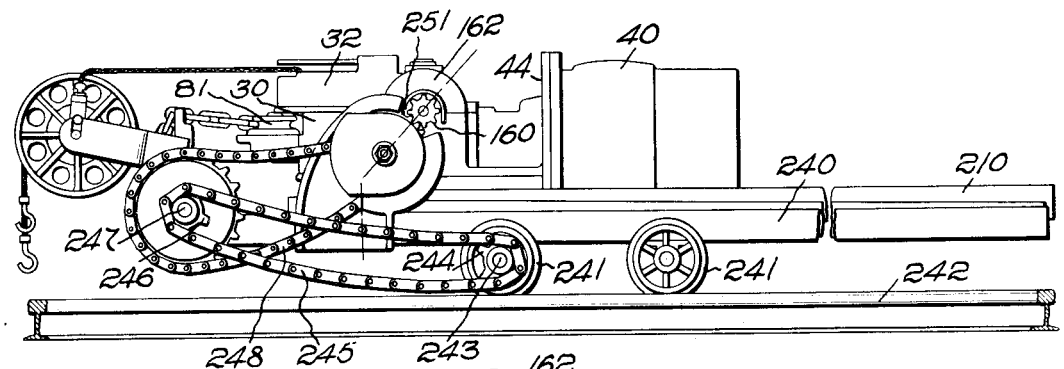
Figure 30:
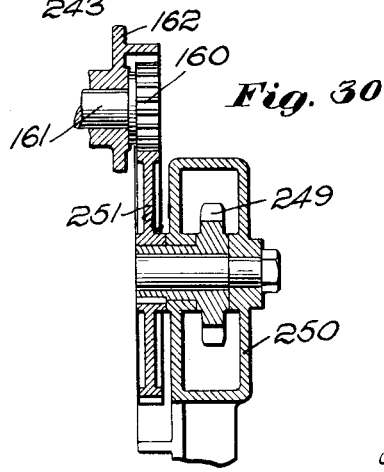

In the drawings, Figure 1 is a plan view of the rear part of a mining machine embodying one form of my invention and showing the principal operating parts thereof; Fig. 2 is a section in elevation, partially broken away taken on the line 2—2 of Fig. 1; Fig. 3 is a detail in plan showing the locating and fastening device for the interchangeable gear; Fig. 4 is a section on the line 4—4 in Fig. 1; Fig. 5 is a plan view of the forward part of the machine, being substantially an extension of the plan shown in Fig. 1; Fig. 6 is a section on the line 6—6 in Fig. 5 showing the adjusting device for the cutter bar; Fig. 7 is a transverse section on the line 7—7 in Fig. 5; Fig. 8 is a section on the line 8—8 in Fig. 5; Fig. 9 is a plan on an enlarged scale of the forward part of the cutter bar; Fig. 10 is a section on the line 10—10, Fig. 9, showing the mounting of the forward sprocket wheel for the cutter chain; Fig. 11 is a plan of the locking spline for the forward sprocket wheel stud; Fig. 12, a side elevation of the same; Fig. 13 is an enlarged section in elevation on the line 13—13 in Fig. 1 showing a portion of the transmission gearing; Fig. 14 is a similar section on the line 14—14 in Fig. 1; Fig. 15 is a plan view on an enlarged scale of the yieldable transmission device; Fig. 16 is a section in elevation on the line 16—16 in Fig. 15; Fig. 17 is an enlarged sectional elevation on the line 17—17 in Fig. 1 showing the mode of controlling the clutches through the controlling slide bar; Fig. 18 is an enlarged section in plan showing the auxiliary truck-driving shaft; Fig. 19 is a plan view of the bed plate; Fig. 20, a side elevation of the same; Fig. 21 is a plan view of the starting frame; Fig. 22, a side elevation thereof with a portion of the machine shown in position therein; Fig. 23 is a diagrammatic view showing the transmission gears arranged consecutively in sectional elevation, Fig. 24 is a side elevation of the cam slide, Fig. 25 is a perspective showing the cutter-chain sprocket wheel clutch and its associated parts. Fig. 26 is a section on line 26—26 in Fig. 1. Fig. 27 is an end view of the idle-gear-positioning plate. Fig. 28 shows a common form of mining machine truck which is adapted to carry the mining machine shown in Fig. 1; Fig. 29 shows the machine loaded on the truck; and, Fig. 30 is a section in elevation and on an enlarged scale, showing the driving gear on the machine and the driven gear on the truck.

In the drawings I have shown for the purpose of illustrating one embodiment of my invention a chain mining machine of the general type shown in U. S. patent to Mitchell, No. 656,414, dated August 21, 1900, and intended in the present instance for "room and pillar" work. It is to be understood, however, that although my invention presents marked improvements related to this particular type of machine, in many of its features it has general and broad application to mining machines of other and quite dissimilar types. In machines of the specific type referred to the machine, although capable of being transported from one place to another upon trucks, nevertheless, during the cutting operation, is fed first longitudinally into the coal and then transversely thereof under its own power and through engagement with a suitably connected and positioned flexible feeding member, such as a chain or the like.

Referring to the embodiment of my invention shown in the drawings, the machine comprises generally an electric driving motor, which is mounted together with the transmission gearing upon a suitable support at the rear of the machine, from which there extends a cutter bar, the latter carrying near its outer end an idle sprocket wheel and at its inner end a driving sprocket wheel. A cutter chain with the usual cutters passes from and about the driving sprocket wheel at the transmission end to and about the idle sprocket wheel, the chain being therefore presented in cutting relation to the lateral adjacent wall of the mine so as to undercut the wall for the full depth of the cutter bar as the machine is caused to be traversed laterally by the action of suitable feeding mechanism upon a stationary and appropriately positioned feeding chain.

In the illustrated machine the motor driving mechanism and other parts at the rear or driving end are mounted primarily upon a flat sheet steel bottom plate or shoe 1, which (Figs. 1 and 2) is rectangular in shape and of sufficient length and breadth to underlie generally the main operating parts, such as the motor and transmission gearing. It is upon this flat bottom plate or shoe that the machine rests when in use upon the floor of the mine and on which it slides for feeding movement. Directly and rigidly attached to the bottom plate is the bed plate 10, shown in section in Fig. 2 and in plan and elevation in Figs. 19 and 20. This may be secured to the bottom plate in any desired manner but herein it is fastened thereto at intervals by a series of rivets 11. The bed-plate and bottom plate or shoe constitute a lower frame member, which herein for constructional advantages, although not necessarily, consists of two separate pieces, as described.

The bed plate gives direct and rigid support to the cutter bar 20 and the main frame 30. For this purpose the upper face of the bed plate is provided with the longitudinal groove 12, with which there is caused to interlock a depending longitudinal tongue 21 upon the under side of the cutter bar, so that when the latter is bolted to the bed plate as hereafter described the coöperating interlocking faces of the elongated tongue and groove offer the most effective resistance to the lateral strains placed upon the bar. This provides not only an effective but a simple attachment for the cutter bar since the clamping bolts are relieved substantially of all lateral strain.

On the cutter bar is supported (Figs. 1 and 2) the motor frame 40 and this is bolted at its forward end through the cutter bar to the bed plate by bolts 41. Bolted to the fore part of the motor frame is the arched piece 42 in which the forward end of the motor shaft is journaled, there being also provided in advance of this a guard piece 43 which serves to protect the motor shaft as this end of the machine moves along the face of the coal. At its rear the motor frame is bolted through the cutter bar to the bed plate by the long bolts 44 which extend to the top of the frame and to this end of the frame is rigidly secured by horizontally disposed bolts the main frame 30 with the tongue and groove connection between the bed plate and cutter bar described. These four bolts referred to are all that are actually employed or needed to securely hold the cutter bar in alinement with the machine, the connections however being quite adequate to resist the lateral strain which is usually not less than two or three tons.

The main frame 30 provides journal bearings 45 for the rear end of the motor shaft and extends rearwardly to support the various elements of the transmission gear, being sustained at the rear end of the machine by pillars 31, which (one only appearing in Fig. 2) are secured to the upper side of the bottom plate and the under side of the frame. This gives a secure and rigid attachment between the bottom plate, cutter bar and the framework of the machine.

The motor 46 is controlled by any suitable or usual controlling devices which may be secured to the outside of the motor frame but which, for the sake of clearness, are not herein shown except for the motor starting box 300 (Fig. 1).

The motor drives the main upright driving shaft 50 through the beveled shaft pinion 47 and the large beveled driving gear 51, the latter having the hub 52 keyed or otherwise secured to the driving shaft 50.

The cutter chain passes about the driving sprocket wheel 60 (Fig. 1) which is loosely and revolubly mounted upon the hub 52 of the driving gear 51 but adapted to be clutched thereto when the machine is ready to cut the coal by the toothed clutching device 70, which latter is vertically slidable upon a depending portion of the frame 30. The sprocket wheel 60 has the removable lining or bushing 61 and is retained upon the hub of the gear by the flanged collar 62, the latter being bolted to the lower end of the gear hub (Fig. 2).

When the motor is operated to feed the machine or for any other purpose when it is not desired to drive the cutter chain, the clutch member 70 is retracted, and the sprocket wheel remains stationary while the gear hub turns within the same.

To start the cutter chain, the clutch member 70 is depressed into its operative position or that shown in Fig. 2. This clutch member comprises a grooved collar 71, depending from which at intervals are toothed members 72 which work in vertical slots or apertures passing entirely through the hub of the driving gear 51. The upper face of the underlying sprocket wheel hub is provided with corresponding notches 63, into which enter the clutch teeth 72 when the clutch is depressed as shown in Fig. 2, thereby locking the sprocket wheel to the driving gear to produce cutting movement of the chain.

The collar 71 is grooved and engaged at either side by a flanged arc-shaped foot 73, (shown in Fig. 25 and also in dotted lines in Fig. 2) so that the latter permits free rotation of the collar with the driving gear, and each arc-shaped foot is connected to a vertical sliding pin 74, so that the collar may be raised to disengage the clutch. At its upper end each pin 74 is jointed to an arm 75 upon the horizontally disposed rock shaft 76, the latter at its outer end being provided with the hand operating lever 77 (Fig. 1). By raising or lowering the hand lever 77 the driving gear may be unclutched from or clutched to the cutter chain sprocket wheel, the lever being retained in its assigned position by the engagement of the spring arm 78 with the upright notched post 79. The arm 78 is connected to the shaft 76 and, lying closely adjacent the lever 77, is sufficiently resilient to snap into one of the two notches shown (Fig. 26) when brought into registration therewith by raising or lowering the lever.

One provision which is of importance in producing a strong efficient machine, and particularly of this type, is the provision of ample bearing surface for the main upright driving shaft and the provision of an adequate bearing both above and below the cutter chain sprocket wheel and the driving gear. In the present instance the upper bearing is provided (Fig. 2) by an elongated journal box 53 formed in the main frame 30, and the lower journal by a hub or bracket 13 formed at the rear end of the bed plate. This latter bracket has a depressed portion 14 which firmly interlocks with a recess in the upper face of the bottom plate and is provided with a removable bushing or lining 54 having a flanged end adapted to underlie the hub of the driving gear 51. At the lower end of the driving shaft there is also provided a removable bearing piece 55 of any suitable material which is supported by and in the bottom plate and acts thereat as a lower step bearing for the main driving shaft. The upper journal bearing in the main frame is likewise provided with a removable lining 56.

It will be seen that the upper and lower bearings lie in rigidly connected parts by which they are maintained in accurate and firm alinement notwithstanding that the height of this machine is considerable less than that of any similar machine with which I am familiar.

The feed chain 80 is associated with the machine in substantially the same fashion as in prior machines of this type, that is to say, it leads to the machine over an idler wheel 81 at its rear end; thence to and about a driving sprocket wheel 82; thence to and about a second idler 83 at the side of the machine; thence forwardly to a third idler sprocket wheel 84 and from there to a suitable anchor or prop (not shown). By fixedly positioning the free ends of the feeding chain the machine may be made to travel under its own power in the usual fashion either longitudinally or laterally.

In positioning the machine after it is off its trucks, or in otherwise handling it about the floor of the mine while it is doing no cutting, it is quite advantageous wholly or partially to effect movement of the machine under its own power and without obliging the operator to resort to the slow process of barring or prying it from one place to another. The feeding speed of the machine during cutting, which is ordinarily from fifteen to forty inches per minute according to the character of the coal, is usually too slow to be availed of for moving the machine where a speed of twelve or fifteen feet per minute is usually desired. On the illustrated machine, therefore, there is provided for the feed-chain driving sprocket wheel 82 not only a slow speed which is to be used while the machine is cutting, but also a higher speed which is intended primarily to be used to facilitate the shifting or positioning of the machine under its own power from one place to another and while the cutter chain is doing no work. For this purpose the sprocket wheel 82 (Figs. 2 and 23) is supported by, though loosely mounted on, the upright fixed sprocket wheel stud 85, driving movement being transmitted to the sprocket wheel at either the high or low speed from the main sprocket wheel driving gear 86, which is fixedly secured above to the upper end of the sprocket wheel hub.

Reference is now had particularly to the plan in Fig. 1 and the sections shown in Figs. 2, 13, 14, and 23, which taken in connection with each other will clearly show the relation of the various driving elements. The section, Fig. 23, is not intended to be structurally accurate but only to show the relative transmitting arrangement of the gears.

Near the upper end of the main driveshaft 50 above the journal bearing 53 there is provided a feed driving pinion 57. This is connected to be driven by the main driving shaft through an overhead yieldable transmission device which will hereafter be more fully described. From the driving shaft movement is first transmitted to the high speed driving shaft 90 through an idler shaft 100 and an idler gear 101. The idler shaft 100 is driven by a gear 102 (Figs. 14 and 23) which meshes with the driving gear 57 on the main driving shaft 50. The idler gear 101 meshes with and is driven by a gear 103 secured to the lower end of the idler shaft 100. Meshing also with the idler gear 101 is a gear 91 secured to the lower end of the upright high speed driving shaft 90, so that through the train of gearing described the latter shaft is driven at a substantially constant rate of speed.

Driving movement is transmitted from the shaft 90 directly to the sprocket wheel 82 by means of the driving pinion 92, which meshes directly with the sprocket wheel driving gear 86. The driving pinion 92 is mounted to freely rotate on the driving shaft 90 but may be clutched thereto at the will of the operator. For this purpose its upper face is provided with clutching teeth 93, which may be engaged with coöperating clutching teeth 94 upon the under side of the upright sleeve-like clutch member 95 which is splined to the driving shaft so as to partake of the movement thereof but slidable lengthwise the same by means to be described.

For obtaining the slow feeding movement the clutch member 94, which with the shaft 90 is constantly driven, has formed thereon gear teeth 96 which mesh with the large intermediate gear 110 loosely journaled on the upright sprocket stud. From the gear 110 driving movement is transmitted to the slow speed sprocket-driving shaft 120 through speed-reduction gearing as follows: The upper face of the intermediate gear is notched or toothed as at 111 and in interlocking engagement with the toothed face thereof is the similarly toothed face of the pinion 112 also loosely journaled on the sprocket wheel shaft so that the pinion is driven by and with the intermediate gear, but, on the removal of the upper frame plate 32, which is bolted to the main frame 30, the pinion may be withdrawn and replaced by another of different size. The pinion 112 meshes with the intermediate pinion 113 and the latter with a large gear 121, which is loose upon the slow. speed driving shaft 120, but may be clutched thereto through the provision of a sliding clutch member 122, generally similar in its operation and construction to the clutch member 95. When the notched lower end of the clutch member 122 is depressed (as shown in Fig. 13) to engage with the notched upper face of the gear 121, the latter, being constantly rotated from and by the driving shaft 90 but at a slower speed, effects the driving of the slow speed driving shaft 120 and also of the sprocket wheel itself through the intermeshing of the sprocket wheel driving gear 86 with the driving pinion 123, the latter pinned or otherwise fixedly secured to the slow speed sprocket wheel shaft to rotate therewith. In other words, the sprocket wheel, through its driving gear 86, may be driven from the high speed shaft 90 or the slow speed shaft 120 according to whether the clutch member 95 or the clutch member 122 is engaged, the depression of the former causing transmission to take place directly through the driving pinion 92 at a relatively high rate of speed and the depression of the latter causing driving movement to be effected indirectly from the high speed driving shaft through the reduction gearing described to the driving gear 121 and thence through the slow speed driving shaft to the sprocket wheel at a relatively reduced rate of speed. When the clutch member 95 is engaged the slow speed driving shaft 120 is turned idly in its journals by the intermeshing of the sprocket wheel driving gear 86 and the pinion 123. When the clutch member 122 is engaged the pinion 92 is turned idly about the shaft 90.

For engaging or disengaging the clutch members at will and thereby throwing in either the slow or the fast feeding speed there is provided a sliding controlling cam consisting of the rod 220 of generally rectangular cross-section (Figs. 1, 13, 17 and 24) and adapted to slide in a grooved way cut in the upper frame plate 32 adjacent the high and low speed driving shafts, the said guideway being capped over by the removable cap 221. The slide rod is moved lengthwise its guideway in either direction by means of a horizontal hand lever 222 (Fig. 1) pivoted to the frame and having one end operatively attached to the slide rod by engagement with a notch 223 in the upper side thereof. On its inner vertical face the slide rod is provided near opposite ends with cam grooves 224 and 225, the general outline of which will be clear from Figs. 13 and 24 and in end elevation from Fig. 17. Seated within each cam groove is a lug or projection 126 (Fig. 17) which projects outwardly and radially, one from a sleeve 97 secured to and embracing the clutch member 95 and the other to a sleeve 124 secured to the clutch member 122. The sleeves are retained upon their respective clutch members by threaded, flanged plates 98 and 125 respectively, so that appropriate movement of the sleeves lifts or lowers the clutch members. These lugs which are numbered respectively 99 and 126 project inwardly and engage each with its groove in the sliding cam. As viewed in Fig. 13 the cam rod is shown in substantially its extreme lefthanded position. The lug 99 has there been drawn into the more elevated portion of its cam groove while the lug 126 is held depressed by engagement with the more depressed portion of its cam groove. This maintains the clutch member 122 in engagement and the clutch member 95 out of engagement. If the rod is moved somewhat to the right the adjacent inclined portion of the cam groove carries the lug 126 upwardly, releasing its clutch member and therefore leaving both clutches disengaged. If it is moved still farther to the right, the lug 126 being still held raised through the engagement with the elevated portion of the cam groove, the lug 99 meets the inclined walls of its groove and is forced downwardly throwing in the clutch 95. The movement of the slide therefore may be made to throw in either clutch or maintain them both unclutched, but the construction is such that it is not possible to have both clutches in 'at the same time, thus avoiding accidental breakage of the feed mechanism. The sleeves or linings 97 and 124 are non-rotatable and form in effect bearings for their respective clutch members which may be raised or lowered to alter their vertical disposition.

Since the slow speed feeding movement should be varied at times within certain limits to allow for different degrees of hardness in the coal or other material to be cut, it is desirable to have some provision for changing the value of the speed reduction. For this purpose provision is made for changing the intermediate speed reduction pinion 112 and replacing it by another suitably proportioned to give the desired speed. As has already been pointed out, the pinion 112 can be withdrawn from the upper end of the sprocket wheel shaft and replaced by another by merely unfastening and lifting off the upper frame plate 32. The pinion 113 is carried upon a stud 114 (Figs. 2, 3 and 4) which is adjustably bolted to the frame plate 32 in an arc-shaped slot which receives the narrow necked portion of the stud, such slot being formed (Fig. 1) concentrically with the axis of the slow speed sprocket wheel driving shaft. When the gear 112 is changed the gear 113 is loosened and again clamped in such position in the said slot as to bring it into suitable engagement with the teeth of its two gears 112 and 121. The housing for the transmission gearing is protected against the entrance of dust or dirt at the bottom by the bottom closure 320.

Where it is left wholly to the skill and attention of the operator freshly to position the intermediate gear 113 it is often improperly clamped in place, the gear centers being either too far from or too close to each other. This not only greatly decreases the efficiency of the transmission but also produces excessive wear or breakage. To avoid accidents or other undesirable consequences, in providing additional change gears for getting different speed reductions I supply with each size of pinion 112 a different gear or pinion-positioning plate 116 for positioning the mating gear 113. This plate is perforated to receive the necked portion of the stud 114 so that when the new gear 112 is applied to the machine the corresponding positioning plate, which has plainly imprinted upon its face suitable designations to indicate the speed reduction for which it is intended, is clamped with the gear 113 upon the frame as will be clear from Figs. 3 and 4. This positioning plate is provided at its under side and at each end with three finished positioning points 117 (Fig. 3) which depend within and engage the walls of the arc-shaped slot of the frame plate so that when clamped in position the pinion 113 is brought into the desired accurate relation to its intermeshing gears.

During the cutting feed there is great strain placed upon the feeding chain and, if unusual resistance be met with, such load is apt to exceed safe limits of strength for the chain. This load in practice amounts to from one to three tons and sometimes four tons. In order to prevent injury to the feeding chain from this cause there is provided at the top of the main driving shaft a yieldable transmission device which is adapted to yield or slip when the cutters meet with excessive resistance.

Referring more particularly to Figs. 15 and 16, this includes a cup-shaped driven member 130, which is secured to or formed as a part of the driving pinion 57. This has a cone-shaped friction surface which engages with a similar surface upon the driving member 131, which latter is splined to the driving shaft but is free to slide lengthwise the same. When the driving member is forced against the driven member, power will be transmitted to the feed gearing in proportion to the force exerted against the driving member. During cutting this pressure is effected by means of the spiral spring 132 seated within a pocket or recess in the driving member 131, and the pressure is regulated and adjusted to any suitable and proper degree by means of the adjusting nut 133, which is threaded on the end of the shaft and may be turned to compress the spring against the driving member or reversely turned to diminish the pressure, it being feasible, for example, on an ordinary machine of this type to set the transmission to a pressure corresponding to any desired pull up to four tons.

Beneath the driven member 130 and the gear 57 is a bearing washer 134 which rests upon a second washer 135, the latter having support upon the flanged end of the lining 56, but clearing the adjacent shouldered portion of the main driving shaft 50. This provides a separate step bearing for the transmission device described relieving the lower step bearing of the main driving shaft from the downward pressure which is exerted against the driving member.

While it is desirable to employ the yieldable transmission device described as a safeguard during the slow cutting feed of the machine, its limit of transmission is apt to be reached when it is attempted to move the machine at the higher speed. In order that there shall not be continued or frequent slippage at the transmission device when the machine is moved about at the higher speed, there is provided means whereby pressure additional to that of the coil spring may be placed upon the driving member of the transmission so that its capacity for transmission may be temporarily increased to accommodate it to the high speed requirements of the transmission gearing.

For this purpose there is threaded on the upper end of the driving member 131 a nut 136 between which and a shoulder upon the driving member there is loosely secured the controlling ring 137. The latter is provided at its sides (Fig. 15) with trunnions 140, jointed to the pivoted yoke 141, the latter pivoted to the upright bracket 142 upon the frame of the machine. This permits the yoke to be raised or lowered to effect thereby a decrease or increase in the pressure exerted between the driving and driven members of the transmission. To effect this change in pressure, the end of the pivoted yoke lever is provided with an open eye 143 which carries upper and lower adjusting screws 144 and 145, the latter engaging the upper and lower sides respectively of the cam roll 146. The cam roll is fixed to the rock shaft 147 journaled upon the frame and carrying at its end the hand lever 148, so that as the latter is moved from one position to another the cam is turned to lower the yoke and add to the pressure of the spring or to raise the yoke and oppose the spring pressure. In the position shown in Fig. 16 the spring is free to act without assistance or opposition from the cam roll. Between the ring 137 and the shoulder of the driven member 130 there is provided a washer 138 of suitable bearing material to relieve the friction thereat.

A cover 139 is provided over the driven member to keep out the dirt and retain the oil which is used for lubricating the friction. The formation of the driven member permits the retention of a considerable quantity of oil and the hub of the driving member is extended within the hub of the driven member for an appreciable distance so as to give a good bearing surface thereat. Upon the bracket 142 there is provided an adjusting screw 149, which overlies the cover 139 and prevents the driven member 130 from rising when the hand lever 148 is operated to draw the friction plates apart.

From the described construction it will be apparent that the spring having been properly adjusted the cam lever 148 is thrown to its neutral position for the cutting feed to give yielding transmission and on the high speed feed to a depressed position to force the friction parts together under greater pressure. It sometimes happens that the operator of a machine when the cutters are dulled by meeting a hard substance, and particularly when the cut is nearly completed, instead of changing the cutters as he should as soon as the machine refuses to do the cutting under the load assigned by the friction, will, if possible, force the machine along without regard to its condition. To avoid the possibility of putting extra strain upon the feeding chain by the use of the described cam lever while cutting and after the spring has ben properly set to the load required, there is here provided interlocking mechanism between the clutch controlling cam slide and the cam lever so that such action, if contemplated, may be prevented.

For this purpose this cam lever (Figs. 13 and 15) is provided with a lug 150 which lies directly over the cam slide, the latter, however, being suitably notched or cut away at its upper face adjacent the lug so that it does not interfere with the free movement of the cam lever and its rock shaft save when the cam slide has moved to its extreme lefthand position as shown in Fig. 13 to effect the slow speed or cutting-feed movement of the chain sprocket wheel. The end of the cam slide, however, is provided with a raised portion 151 having a lateral recess 152 which, in that position of the cam slide, interlocks with the lug 150 and prevents further movement of the cam lever. When therefore the slow speed cutting feed is employed the cam lever and its attached mechanism is so locked against movement, that no pressure beyond that of the controlling spring can be placed upon the friction, although at other times such additional pressure may be employed.

As is usual in this class of machines, there is provided a gearing connection by which driving movement may be communicated to the trucks on which the machine is temporarily mounted. In the present case this consists of a pinion 160 (Figs. 1 and 18) which is mounted with its axis horizontally disposed and at the side of the machine. This pinion, which may be suitably connected with the truck for the propulsion thereof (see Figs. 29 and 30), is carried upon a short shaft 161 suitably journaled in the frame, capable also of endwise movement to cause the retraction of the pinion within the housing 162, in which position it is shown in the drawing, or its projection out and beyond the said housing.

The shaft 161 has keyed thereto the bevel gear 163 which in the inner position of the pinion is caused to engage with the main driving bevel gear 51 so that the pinion 160 is driven directly therefrom. In its outer position the bevel gear 163 is out of mesh with the main driving gear so that the pinion 160 is then idle. The end of the shaft 161 opposite the end carrying the pinion 160 is grooved and engaged by a yoke jointed to the pivoted lever 164, so that by means of this lever the truck driving shaft may be thrown into or out of engagement. The end of the lever rests upon the raised segmental portion 165 on the frame of the machine, the latter at each end being provided with a notch which serves to locate the lever at one end in its operative and at the other end in its inoperative position. Thus, when it is desired to drive the truck, the main bevel gear is unclutched from the cutter sprocket and the lever 164 thrown to engage the truck driving shaft therewith, the feed chain and the cutter chain thereupon becoming idle and the motor driving the truck without operating any of the remaining gearing of the machine. The pinion 160 in its operative position meshes directly with a gear upon the truck (not shown). It will be seen that this truck driving mechanism is self-contained upon the machine and can be readily shifted in and out of operative position by the lever 164.

While any suitable form of truck may be employed, in Figs. 28 to 30 inclusive there is shown a truck adapted to receive the described form of machine together with its starting frame, and permit its transference from one point to another. Such truck (Fig. 28) comprises the frame-work or body 240 resting upon the two pairs of wheels 241. The latter may run upon the mine floor, but herein are flanged to engage with suitable rails 242. The rear wheels are fixed to a driving shaft 243 having secured thereto the driving sprocket wheel 244, to which driving movement may be communicated through the sprocket chain 245, the latter driven from a sprocket wheel 246 on the countershaft 247. Such countershaft, in turn, is driven by means of the sprocket chain 248, passing to a sprocket wheel 249 (see Fig. 30) journaled in a bracket or frame portion 250 mounted at the rear of the truck and at the side thereof. Fixedly secured to the sprocket wheel 249 to turn the same is the driving gear 251, which is so positioned as to be brought into mesh with the driving pinion 160 on the machine when the latter is placed upon the truck and slid to its rearmost position thereon (see Figs. 29 and 30). In this position of the machine, through the previously described truck driving mechanism, power may be transmitted from the motor through the driving gearing to the transmission mechanism on the truck to cause the machine under its own power to propel the truck.

The cutter bar 20 projects forward beyond the bottom plate, being provided (Figs. 5–10) at its sides with overhanging top and bottom gib plates 170 and 171, which are securely riveted to the bar. Near its forward end the cutter bar is suitably formed to receive upper and lower sprocket wheel carrying plates 180, 181 (Figs. 5, 7, 9 and 10), the latter being secured in such manner as to permit their longitudinal adjustment to take up the cutter chain when it has lengthened by wear in its joints. These plates are held in finished ways in the cutter bar by means of bolts 182, the latter passing through slots on the cutter bar so that when loosened the plates may be simultaneously given a forward adjusting movement. This is accomplished by means of the adjusting screw 183 (Figs. 6 and 7), the enlarged head of which, 184, is free to turn within a seat formed in the cutter bar but held therein against longitudinal movement and the threaded portion of which turns in a nut 185 having flanged ends and interlocked between the two plates. Where the screw passes through a cut away portion 186 of the cutter bar it is provided with a hexagonal portion 187 by which the screw may be turned and the plate pushed forward as desired.

At the forward ends these plates are secured together (Fig. 10) by means of a hollow stud 190 about which turns the idler sprocket 191. This stud is threaded into the lower plate but has a shouldered portion at each end against which the respective plates abut so that they are held at a fixed distance apart. The upper plate 180 is held against its shoulder by means of the threaded plate 192 which is threaded into the end of the stud 190. The hollow interior 193 of the stud is employed as an oil chamber, access thereto being had through a threaded plug 194 which closes an aperture formed in the threaded plate 192. The oil chamber is provided with oil ducts 195 which lead to the bearing surface of the sprocket, which herein is between the outer walls of the stud and the inner walls of a removable bushing or lining 196 secured within the idler sprocket.

To positively lock the stud against unthreading there is provided a key shown in Figs. 11 and 12. This key is provided with an upright portion 200, which, prior to the insertion of the threaded plate 192 is seated in a lateral notch in the upper sprocket plate 180. When the plate 192 is placed in position it is caused to overlie a horizontal portion 201 of the key, thereby preventing its escape. The threaded plate in operation is prevented from turning and thereby loosening the key by means of the set screw 202 (Fig. 9). This method of locking the several parts permits the machine to be run in either direction without the possibility of the stud unscrewing from the plate.

In making the starting or sumping cut, which is longitudinally toward the wall of the mine, it is desirable to provide a starting frame or other means for guiding the machine, so that the starting cut will be straight and accurate. Without such guidance the irregularities in the bottom of the mine might be such as to impair the alinement of the starting cut. With the present form of machine I provide a starting frame shown in Figs. 21 and 22 in which the machine rests when unloaded from the truck but from which it withdraws laterally immediately upon completing the starting cut. This frame is constructed of a pair of angle irons 210, extending lengthwise the same at either side thereof, the said angle irons being tied together at the forward end by the broad base plate 211, the intermediate plate 212 and the rear tie plate 213. The rear part of the machine is also prevented from spreading by a channel iron 214. The machine, as is represented in Fig. 22 (the bottom shoe and bed plate only being shown) is placed in the frame with the bottom shoe resting upon the horizontal flanges of the angle irons 210. When in the starting frame and while being carried on the trucks the machine is locked or fixed in position by the pivoted latch 230, which latter is swung inwardly to cause its hooked end to embrace one of the supporting pillars 31 of the machine. When the starting cut is commenced, the machine after having been unlatched is caused to feed forwardly in the starting frame from the rear toward the front thereof, the shoe sliding upon and being guided by the horizontal and upright flanges of the angle irons. When the full depth of the cut is reached the machine is at the forward end of the frame. The feed is then started laterally and the machine drawn off from the starting frame at one side thereof where the upright flange of one angle iron (the upper one in Fig. 21) is cut away. When the lateral feeding of the machine begins, it withdraws wholly from the starting frame and subsequent feeding movement takes place by direct contact of the bottom shoe upon the mine floor. The broad base plate 211 at the forward end of the frame insures the withdrawal of the machine from the frame in good alinement.

While I have shown and described one practical embodiment of my invention and one possessing great merits of simplicity, strength and compactness, it is to be understood that my invention is not limited to the described details of construction or the particular application of the invention made herein, but that extensive modifications may be made in the described construction and wide deviations from the details disclosed without departing from the spirit of the invention. It is also to be understood that many of the features herein disclosed are within the scope of my invention though employed separately from other features thereof.

Claims—

1. In a mining machine, the combination with cutting mechanism and means for operating the same, of a bottom plate or shoe sustaining the same adapted to slide along the mine bottom, a starting frame having provision for the longitudinal movement of the machine along the said frame during the starting cut and also for the withdrawal of said machine laterally over and from said frame after the travel of the machine longitudinally and the completion of the starting cut.

2. In a mining machine, the combination with cutting mechanism and means for operating the same, of a starting frame having provision for the longitudinal movement of the machine along the same frame during the starting cut, and also for the withdrawal of the machine laterally over and from the said frame after the travel of the machine longitudinally and the completion of the starting cut.

3. A starting frame for a mining machine having longitudinal guide-ways for the travel of said machine upon said frame, and having a lateral exit for its withdrawal therefrom.

4. A starting frame for a mining machine comprising a rigid structure presenting guiding plates to the travel of said machine upon said frame, one of the guiding plates being cut away near one end to permit the withdrawal of the machine from the frame.

5. A starting frame for a mining machine having the angle irons 210 at the sides thereof, and the connecting bottom plates 211, 212 and 213, one of the angle-irons being provided with a lateral cut-away portion.

6. In a mining machine, the combination with cutting mechanism and means for operating the same, of a separate starting member along which the machine is adapted to travel while making the starting cut, and a shoe on which the machine is adapted to travel to perform the transverse cut.

7. A mining machine having cutting mechanism and means for operating the same, and a separate starting member on which the starting cut is completed.

8. A mining machine having cutting mechanism and means for operating the same, a cutter bar held in fixed relation to the machine during the entire cutting operation, a bottom plate or shoe for said machine and means for feeding the machine during the entire cutting movement along with and upon said shoe.

9. A mining machine having cutting mechanism, means supporting the machine for sliding movement along the mine bottom, a starting frame in which the machine is adapted to slide upon the said sliding supporting means for accomplishing the starting cut, and means permitting withdrawal of the machine from the frame after the completion of the starting cut.

10. In a mining machine, the combination with cutting mechanism, means supporting the machine for sliding movement along the mine bottom, starting means by which the machine is guided while moving with the said supporting means for making the starting cut, a flexible feeding member and feeding mechanism on the machine for drawing the machine along the starting means, means for so directing the feed member to withdraw the machine laterally from the starting means to complete the lateral cut while still moving with and on the said supporting means.

11. In a mining machine, the combination with cutting mechanism, a bottom plate or shoe to which the machine is rigidly attached, means to direct the machine while moving with the shoe to make the starting cut, and flexible feeding and guiding means to direct the machine for subsequently making the lateral cut upon the shoe.

12. The combination with a mining machine having cutting mechanism, of supporting means secured to the machine along with and upon which the machine is adapted to travel, a starting member presenting guiding means to direct the travel of the machine in making the starting cut, said guiding means being ineffective to prevent lateral withdrawal of the machine from the starting member on completion of the starting cut.

13. The combination with a mining machine having projecting cutting mechanism and adapted to cut forwardly into the wall and then laterally to undercut the same, of means for operating the cutting mechanism, a bottom plate or shoe for said machine, and means for feeding the machine during both its starting and the lateral movements along with and upon said shoe.

14. In a mining machine, the combination with a frame, a bottom plate or shoe, a cutter bar projecting from the said shoe, means for securing the cutter bar, shoe and frame rigidly together, and means for feeding the machine forwardly in the direction of the length of the cutter bar and thereafter laterally while moving with and upon the said shoe.

15. In a mining machine the combination with a cutting mechanism of a bottom member on which the machine is adapted to slide along the mine-bottom, a guide for guiding the bottom member longitudinally on making the initial or starting cut, said member and guide being separable laterally after the said longitudinal movement.

16. A mining machine having a cutter chain and means for operating the same, a bed plate for said machine, a bottom plate or shoe beneath said bed plate and permanently held in fixed relation thereto of a cutter bar extending inward from the inner end of the machine and extending outward therefrom approximately to the outer end thereof, an electric motor rigidly fixed relative to said bed plate, cutter driving gearing having a bearing support on said bedplate, power transmitting devices extending from the motor to the chain driving gearing, a flexible draft device, a rotary driving member engaging said flexible draft device and power transmitting devices between the motor and said rotary driving member.

17. A mining machine having the bed plate 10 and the bottom plate 1 underlying said bed plate, said bottom plate serving as a sliding support for the machine.

18. A mining machine having a cutter chain and means for operating the same, a cutter bar, and a bottom plate or shoe rigidly attached to the cutter bar over and beyond which said cutter bar projects.

19. A mining machine having a cutter chain, an upper frame member, a lower frame member on which the machine is supported for sliding movement along the mine bottom, a cutter bar clamped between said upper and lower frame members, and means for feeding the machine laterally with relation to the direction of length of the cutter bar.

20. A mining machine having a lower frame member upon which the machine is adapted to slide along the mine bottom, a cutter bar resting upon said lower frame member, a motor resting upon said cutter bar, and clamping means for clamping the motor, cutter bar and frame member rigidly together.

21. A mining machine having cutting means, supporting means, feeding mechanism, means for operating the feed mechanism at one speed in one direction and at a higher speed in the opposite direction, and a power limiting transmission device through which feeding movement is effected at both speeds.

22. A mining machine having a cutter bar, a motor frame mounted rigidly upon the rear end of said cutter bar, a bed plate also beneath the rear end of said cutter bar, means for clamping said cutter bar between said bed plate and said motor, and feeding means for feeding the machine laterally with relation to the direction of length of the cutter bar.

23. A mining machine having a cutter chain, a bed plate upon which the machine is adapted to slide along the mine, a motor, a cutter bar between the bed plate and motor, the said bed-plate, cutter bar and motor being rigidly clamped together, and means to feed the machine laterally with relation to the direction of length of the cutter bar.

24. A mining machine having a lower frame member upon which the machine is adapted to slide along the mine bottom, a cutter bar rigidly secured with relation to said lower frame member and having one end projecting beyond the same, a horizontally arranged motor secured with relation to said cutter bar and over and above the said lower frame member, an upright driving shaft at the rear of said motor and said cutter bar, cutting mechanism carried by the cutter bar, and means for driving the same from the said upright shaft.

25. A mining machine having a lower frame member upon which the machine is adapted to slide along the mine bottom, a cutter bar secured to said lower frame member having one end projecting beyond the same, a horizontally arranged motor secured to said cutter bar over and above the said lower frame member, an upright driving shaft at the rear of said motor and said cutter bar, a lower bearing for said shaft in said lower frame member, an upper frame member, an upper bearing for said shaft in said upper frame member, cutting mechanism upon said cutter bar, and means for driving the same from said shaft.

26. A mining machine having a lower frame member upon which the machine is adapted to slide along the mine bottom, a cutter bar secured to said lower frame member having one end projecting beyond the same, a horizontally arranged motor secured to said cutter bar over and above the said lower frame member, an upright driving shaft at the rear of said motor and said cutter bar, a lower bearing for said shaft in said lower frame member, an upper frame member, an upper bearing for said shaft in said upper frame member, cutting mechanism upon said cutter bar, means for driving the same from said shaft, and transmission gearing also connected to said upright driving shaft mounted on said upper frame member.

27. A mining machine having a cutter chain, an upright driving shaft therefor, a frame member below said cutter chain, a cutter bar lying directly against and rigidly attached to said lower frame member, a frame member above said cutter chain rigidly secured to said lower member, and a bearing in said lower frame member for said upright driving shaft.

28. A mining machine having a cutter chain, a cutter bar, an upright driving shaft for the cutter chain, a bed plate beneath said cutter bar and to which the said cutter bar is attached, and a bearing in the bed plate for the said upright shaft.

29. A mining machine having a cutter chain, a cutter bar, a bed plate beneath said cutter bar, a bottom plate or shoe beneath said bed plate, an upright driving shaft for the cutter chain, and a lower bearing for said shaft provided by said bed plate and bottom plate.

30. A mining machine having a cutter chain and a cutter bar, a bed plate beneath the cutter bar, an upright driving shaft, a bottom plate beneath the bed plate, a journal bearing in said bed plate for said upright shaft, said journal bearing being extended downwardly to interlock with said bottom plate.

31. A mining machine having a cutter chain, an upright driving shaft, a driving sprocket wheel thereon, a frame member below said sprocket wheel having a journal bearing for said shaft extended upwardly within the vertical limits of said sprocket wheel.

32. A mining machine having a cutter chain, a cutter bar, a bed plate beneath said cutter bar, a motor upon said cutter bar, said cutter bar, bed plate and motor being fixed in relation to each other, an upright driving shaft driven from said motor and at the rear thereof, and a sprocket wheel on said driving shaft for operating said cutter chain, and a journal bearing for said shaft below said sprocket wheel.

33. A mining machine having a cutter chain and cutter bar, an upright driving shaft, a lower frame member, a sprocket wheel on said driving shaft, a journal bearing for said shaft in said frame member and below said sprocket, and interlocking surfaces between said cutter bar and the lower frame member.

34. A mining machine having a bottom plate on which said machine is adapted to travel, a horizontally disposed motor, a cutter bar upon one end of which said motor is mounted, an upright driving shaft, a driving sprocket wheel, and a journal bearing for said shaft both above and below said sprocket wheel.

35. In a mining machine, the combination with a cutter bar and cutter chain, of supporting means with and upon which the machine is adapted to slide along the mine bottom, and a driving sprocket for said chain having a bearing support rigidly attached to said supporting means.

36. In a mining machine, the combination with a cutter bar and cutter chain, of a bottom plate or shoe, an upper frame member, and a driving sprocket for the cutter chain having a bearing support rigidly attached to said shoe, and a second bearing support rigidly attached to said frame member.

37. In a mining machine, the combination with a cutter chain, of a cutter bar, a lower frame member, beneath said cutter bar, said machine being adapted to slide along the mine with and upon said frame member, a motor upon said cutter bar, an upright driving shaft driven from said motor and at the rear thereof, a sprocket wheel on said driving shaft for operating the cutter chain, and a journal bearing for said shaft below said sprocket.

38. A mining machine having a cutter chain, an upright driving shaft, a cutter bar, a frame member beneath said cutter bar upon which frame member the machine is supported for sliding movement along the mine bottom, and a step bearing for said upright shaft in said frame member.

39. A mining machine having a bed plate, a horizontally disposed motor, a cutter bar between the motor and the bed plate, an upright driving shaft, a bevel gear upon said driving shaft meshing with a bevel pinion upon the motor therefor, a driving sprocket wheel for the cutter chain, means for clutching said sprocket wheel to or unclutching the same from said driving shaft, and a journal bearing in said bed plate for said driving shaft.

40. A mining machine having a cutting chain, an upright driving shaft therefor, a sprocket wheel on said driving shaft, a journal bearing for said shaft below said sprocket wheel, a feeding mechanism for said machine, a frictional transmitting device between said feeding mechanism and said driving shaft, and a thrust bearing for said transmitting device.

41. A mining machine having cutting mechanism and means for operating the same, feeding mechanism, means for operating said feeding mechanism at relatively different speeds, a yieldable transmission device through which driving movement is effected at the lower speed, adjustable means for insuring the transmission of a given feeding effort only, and means providing for the transmission of a greater feeding effort at will without altering said adjustable means.

42. A mining machine having cutting mechanism and means for operating the same, feeding mechanism, means for operating said feeding mechanism at relatively different speeds, a yieldable transmission device for transmitting both the higher and lower speed effective at the lower speed for limiting the power transmitted to said feeding mechanism, and means for increasing the transmitted power at the higher speed.

43. A mining machine having feeding mechanism and means for transmitting feeding movement thereto at a higher or lower speed, a frictional transmission device, means for adjusting the pressure upon said friction device to limit the power available at the slower speed, means for increasing the pressure at the higher speed, and means for preventing the application of said last named means at the lower speed.

44. A feeding mechanism for a mining machine having speed transmission gearing, a clutch controlling device for changing the speed of transmission, a friction transmission device normally maintained under predetermined pressure, means for permitting the increase of pressure, and interlocking connections between said last named means and said clutch controlling devices to prevent its application at the slower speed.

45. A mining machine having a feeding chain, a sprocket wheel engaging therewith and feed transmission gearing for driving the same at either one of two speeds including a pair of vertically slidable clutch members, a sleeve retained upon each of said clutch members, the latter being rotatable within said sleeve but adapted to be raised or lowered thereby, an outwardly projecting lug upon each of said sleeves, cams for engaging with said lugs, and means for moving said cams.

46. A feeding machine having a feeding chain, a sprocket wheel engaging therewith and feed transmission gearing for driving the same at either one of two speeds including a pair of vertically slidable clutch members, a sleeve retained upon each of said clutch members, the latter being rotatable within said sleeve but adapted to be raised or lowered thereby, an outwardly projecting lug upon each of said sleeves, cams for engaging with said lugs, means for moving said cams, a yieldable transmission device, means for varying the pressure on said transmission device, and interlocking connections between said cams and said last named means.

47. A mining machine having a cutter chain and a feeding chain, feeding mechanism, means for transmitting power to said cutter chain, means for transmitting power to said feeding mechanism at either one of a plurality of speeds, and means for insuring the limiting of said power transmission to a predetermined amount at one of said speeds.

48. A mining machine having feeding mechanism and means for transmitting power thereto at a plurality of different speeds, a yieldable transmission device through which the said power is transmitted, said device comprising a driving and a driven member in frictional engagement, adjustable means for maintaining pressure between said driving and driven members, and additional means for increasing or decreasing the pressure between said members.

49. A mining machine having feeding mechanism and means for transmitting power thereto at a plurality of speeds, means to limit the transmitted power to a predetermined limit at one speed, and means permitting said limiting means to be rendered ineffective at another speed whereby the predetermined limit may be exceeded, when desired.

50. A mining machine having a feeding chain, a sprocket engaging therewith and feed transmission gearing for driving the same at either one of two speeds including a pair of vertically slidable clutch members, each mounted upon and keyed to its respective driving shaft but adapted to have sliding movement thereon, and a sliding cam exercising simultaneous control over said clutch members.

51. In a mining machine, the combination of a bottom plate or shoe, of a driving motor, feeding mechanism including low speed and high speed transmission devices, a yieldable transmission device between the motor and the feeding mechanism and through which both the high and low speeds are transmitted, and means for increasing at will the power transmitted therethrough.

52. In a mining machine, the combination with a driving motor, feeding mechanism including a pair of clutches, one for high and the other for low speed transmission and transmission mechanism controlled thereby, and a yieldable transmission device between the motor and the feeding mechanism.

53. In a mining machine, the combination with a driving motor, of feeding mechanism including low speed and high speed transmission devices, a controlling member for simultaneously controlling said devices, a yieldable transmission device between the motor and the feeding mechanism, and a separate controlling member for the transmission device.

54. In a mining machine, the combination with supporting means upon which the machine is adapted to slide along the mine, a flexible feeding member, a driving motor, feeding mechanism engaging said feeding member and including a pair of clutches with transmission mechanism controlled thereby, one for high and the other for low speed transmission, and a yieldable transmission device between the motor and the feeding mechanism.

55. A mining machine having cutting means, supporting means on which the machine is adapted to slide along the mine, flexible feeding mechanism, means for operating said feeding mechanism at two different speeds and yieldable transmission means independent of the cutting means through which feeding movement is effected at both speeds.

56. A feed transmitting mechanism for a mining machine comprising the clutch controlling rod 220, having the notch 152, the yieldable transmission device with the cam shaft 147 and the lug 150.

57. A yieldable transmission device comprising the friction members 130 and 131, the controlling spring 132 and the adjusting nut 133, the ring 137 for controlling said members, the actuating lever 141, the cam 146 and the cam shaft 147 for moving the lever.

58. A mining machine having cutting mechanism, means for operating the same, feeding mechanism, a yieldable transmission device through which power is transmitted to said feeding mechanism, and a controlling cam for controlling said yieldable transmission device.

59. In a mining machine, the combination with a driving motor, of a cutter, mechanism for moving the cutter, feeding mechanism having a yieldable transmission device, the same including two friction engaging members, a spring forcing said members into frictional engagement, and means for increasing or decreasing the frictional engagement independently of the spring.

60. In a mining machine, the combination with a driving motor, of a cutter, mechanism for moving the cutter, feeding mechanism, of a yieldable power transmission device comprising inner and outer cone-shaped friction members, the inner member having a pocket or recess and a spring seated in said recess and acting to force said members into engagement.

61. In a mining machine, the combination with an upright driving shaft, of a bed plate or shoe, a yieldable friction driven device on said shaft said device exerting pressure in the direction of the length of said shaft and a step bearing for said driving shaft fixed with relation to said bed plate.

62. A mining machine having a cutter chain, a cutter bar, sprocket wheel supporting plates near the outer end of said cutter bar and longitudinally slidable therein, a nut carried between said plates, a rotatable but longitudinally fixed adjusting screw engaging said nut, and clamping bolts for securing said plates in adjusted position.

63. A mining machine having a cutter chain and a cutter bar, the latter having an idle sprocket wheel near the outer end thereof, a stud upon which said sprocket wheel is journaled, said stud being shouldered at each end to hold separated the upper and lower plates of said bar while threaded into one of said plates, and means for locking said stud against unscrewing.

64. A mining machine having a cutter chain and a cutter bar, the latter having an idle sprocket wheel near the outer end thereof, a stud upon which said sprocket wheel is journaled, said stud being shouldered at each end to hold separated the upper and lower plates of said bar while threaded into one of said plates, a key for locking said stud to one of said plates, and a threaded plate screwed into the stud and overlying said key or a portion thereof to prevent its escape.

65. A mining machine having a cutter chain and a cutter bar, the latter having an idle sprocket wheel near the outer end thereof, a stud upon which said sprocket wheel is journaled, said stud being shouldered at each end to hold separated the upper and lower plates of said bar while threaded into one of said plates, a key for locking said stud to one of said plates, a threaded plate screwed into the stud and overlying said key or a portion thereof to prevent its escape, and means for locking the threaded plate against unscrewing.

66. A mining machine having a cutter chain, a cutter bar, a sprocket wheel at the outer end thereof, a stud threaded and screwed into said cutter bar upon which said sprocket is journaled, and means for locking said stud against unscrewing to permit the driving of said sprocket wheel in either direction.

67. A mining machine having a cutter bar and outer sprocket wheel in combination with the stud 190, threaded plate 192 and key 200.

68. A mining machine having a cutter chain, a cutter bar having upper and lower plates, an idle sprocket wheel near the outer end thereof, a stud threaded into one of said plates and acting as a spacing member between the two said sprocket wheels being journaled upon said stud, the latter being provided with an interior lubricating chamber, and lubricating ducts leading from the inside to the outside of said stud.

69. A mining machine having supporting means upon which the machine is adapted to slide while cutting, cutting mechanism and means for operating the same, driving mechanism for the machine, feeding mechanism adapted to be operated by the driving mechanism for feeding the machine while cutting, truck driving mechanism also therefor to propel the machine when mounted upon a truck, two interengaging members one on the truck and the other on the machine and a supplemental clutch for throwing said truck driving mechanism into or out of engagement with the driving mechanism of said machine.

70. A mining machine having cutting mechanism and means for operating the same and truck driving mechanism comprising a longitudinally slidable shaft adapted to be thrown into or out of engagement with the driving mechanism of said machine.

71. A mining machine having a cutter chain, a driving sprocket wheel therefor, driving mechanism, means for throwing said mechanism into or out of engagement with said driving sprocket wheel, truck driving mechanism, and means also for throwing said truck driving mechanism into or out of engagement with said driving mechanism.

72. A mining machine having an upright driving shaft, a beveled driving gear therefor, a horizontal truck driving shaft, and means for throwing said truck driving shaft into or out of engagement with said beveled driving gear.

73. In a mining machine, the combination with a bottom plate or shoe on which the machine is adapted to slide, of a cutter chain, a driving sprocket, a beveled gear for driving said sprocket, truck driving means, a beveled gear adapted to mesh with said first named gear to drive said truck driving means, and means for throwing said last-named gear into or out of engagement with said first-named gear.

74. In a mining machine, the combination with a machine frame adapted to be placed on a truck, of machine driving mechanism, cutting mechanism, truck driving mechanism, said frame being separable from said truck driving mechanism for operating independently thereof, and a longitudinally slidable member adapted when said machine frame is in position on said truck to connect the truck driving mechanism with or disconnect the same from the driving mechanism of the machine.

75. In a mining machine, the combination with a driving motor, cutting means driven by said motor, feeding means with which the said machine may be engaged for feeding the machine while cutting under the power of said motor, truck driving means for propelling the machine when mounted upon a truck, and a truck driving part carried by said machine and adapted to be brought into interengaging relation with another part on the said truck by the act of positioning the machine on the truck, for connecting the motor to the truck driving means.

76. A mining machine having feeding mechanism, speed transmission gearing for said feeding mechanism, the same including a removable speed change gear, a mating gear, a positioning member to which said latter gear is secured, and means upon said positioning member coöperating with the frame of the machine for accurately locating said gear in position.

77. A mining machine having a feeding mechanism and speed transmission gearing therefor, the same including an idler gear, a stud upon which said gear is mounted, an arc-shaped slot in the machine frame permitting the adjustment of said gear to different positions, a removable positioning plate through which said stud passes, and positioning means upon said plate engaging with the machine frame to locate the gear center in its intended position.

78. A mining machine having a feeding mechanism and power transmission gearing therefor including the gear 113, plate 116, and stud 114.

79. A mining machine having a starting frame and a swinging latch for fixedly holding said machine in said starting frame.

80. A room and pillar mining machine having a bottom plate or shoe upon which the machine is adapted to slide along the mine bottom, a cutter bar rigidly fixed with relation to said bottom plate during the entire cutting operation, an upper frame, transmission gearing carried by said frame, and means for supporting the upper frame on the bottom plate, leaving an open space between the shoe and the frame and on either side of the cutter bar to permit the passage of cuttings through the machine.

In testimony whereof, I have signed my name to this specification in the presence of two subscribing witnesses.

ALBERT BALL.

Witnesses:
MORRIS P. HOLMES,
ORVIS L. CRAIN.